Aug. 6, 1940.  M. C. BOYD  2,210,163
AIRPLANE WING AND WING SPAR
Filed March 7, 1938  2 Sheets-Sheet 1
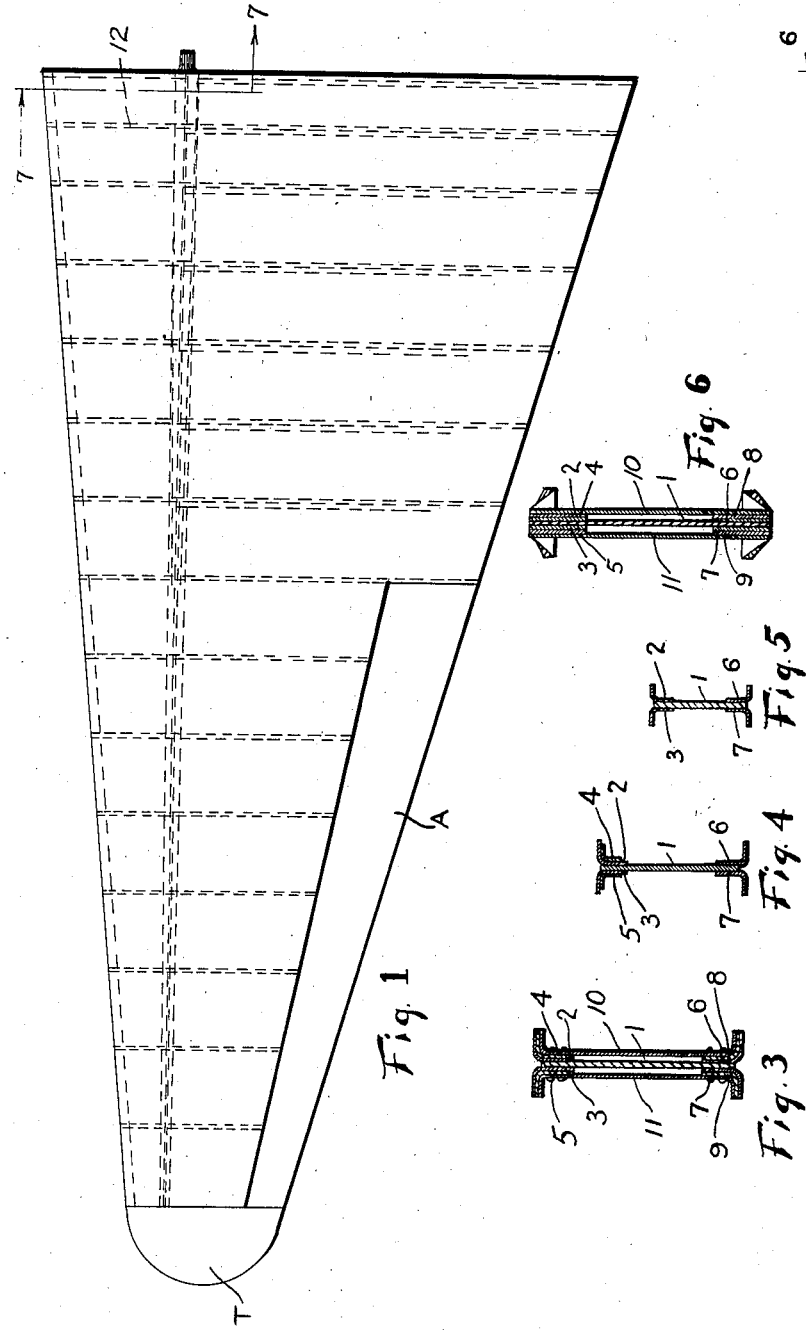
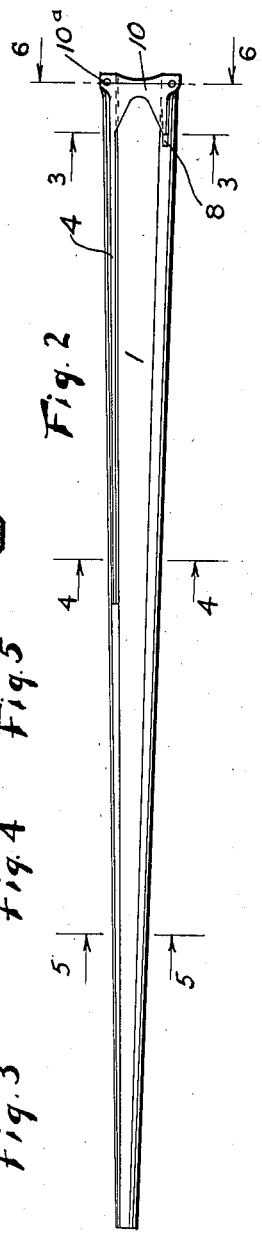
INVENTOR.
Millard C. Boyd
BY A. B. Bowman
ATTORNEY.

Aug. 6, 1940.                M. C. BOYD                2,210,163
                    AIRPLANE WING AND WING SPAR
                      Filed March 7, 1938          2 Sheets-Sheet 2

INVENTOR.
Millard C. Boyd
BY
A. B. Bowman
ATTORNEY.

Patented Aug. 6, 1940

2,210,163

UNITED STATES PATENT OFFICE 2,210,163

AIRPLANE WING AND WING SPAR

Millard C. Boyd, San Diego, Calif., assignor of one-half to The Ryan Aeronautical Co., San Diego, Calif., a corporation of California Application March 7, 1938, Serial No. 194,415

7 Claims. (Cl. 244—123)

My invention relates to an airplane wing and the wing spar used in connection therewith, and particularly it relates to the leading edge of the wing including the spar, which is a single spar, and the objects of my invention are:

First, to provide a single spar near the leading edge of the airplane wing that has sufficient strength to support the load so that the leading edge portion of the wing needs very little flexure strength, said flexure strength being supplied by the single spar near the leading edge of the wing;

Second, to provide a wing construction in which the spar ribs, and a tube at the leading edge are combined with the wing covering to provide a very light, strong and efficient leading edge portion for airplane wings;

Third, to provide a swing spar for airplane wings that is of the cantilever type;

Fourth, to provide an airplane wing spar which is built of a plurality of angle members arranged to provide equilibrium of strength;

Fifth, to provide combined rib with a tube reenforcing at the leading edge;

Sixth, to provide a novelly constructed airplane wing spar;

Seventh, to provide a novelly constructed airplane wing rib;

Eighth, to provide a wing construction which is very simple and economical of construction, easy to build, efficient in its action, and which will not readily deteriorate or get out of order.

Figure 7:
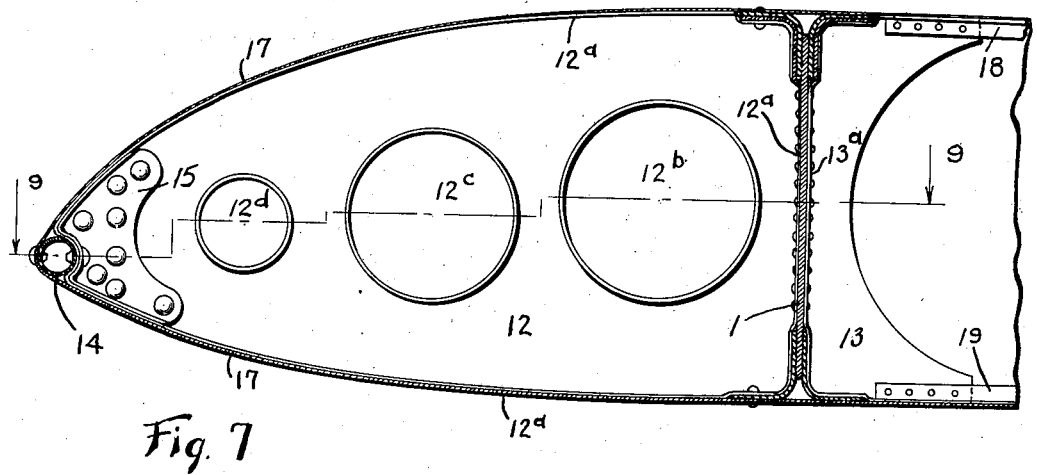
Figure 8:
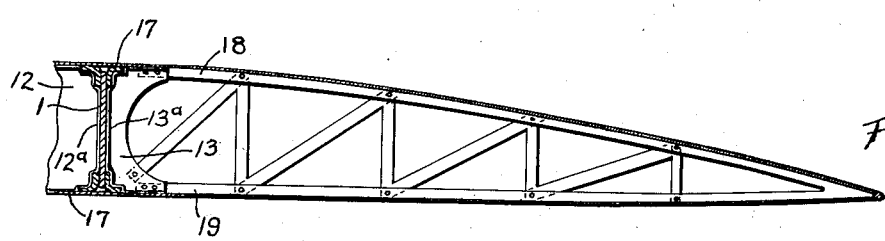
Figure 9:
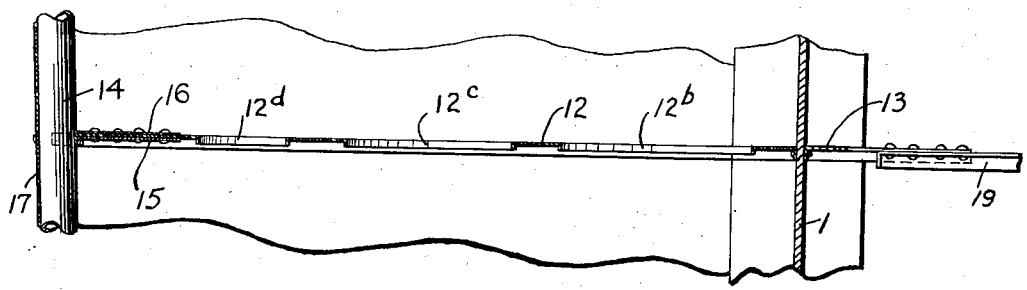

With these and other objects in view as will appear hereinafter, my invention consists of certain novel features of construction, combination, and arrangement of parts and portions as will be hereinafter described in detail and be particularly set forth in the appended claims, reference being had to the accompanying drawings and to the characters of reference thereon which form a part of this application in which:

Figure 1 is a top or plan view of a wing structure embodying my improvement; Fig. 2 is a side elevational view of one of the wing spar members; Fig. 3 is an enlarged sectional view taken from the line 3—3 of Fig. 2; Fig. 4 is a similar view taken from the line 4—4 of Fig. 2; Fig. 5 is a similar view taken from the line 5—5 of Fig. 2; Fig. 6 is an enlarged sectional view taken from the line 6—6 of Fig. 2; Fig. 7 is an enlarged sectional view of the leading edge portion of the wing taken from the line 7—7 of Fig. 1; Fig. 8 is a fragmentary sectional view of the trailing edge of the wing including the spar and its connection with the ribs on a reduced scale; and Fig. 9 is a sectional view taken from the line 9—9 of Fig. 7.

Similar characters of reference refer to similar parts and portions throughout the several views of the drawings:

The spar web member 1, spar angle members 2, 3, 4, 5, 6, 7, 8, and 9, spar supports 10 and 11, rib members 12 and 13, leading edge tube 14, leading edge tube and rib connections 15 and 16, and wing covering 17, constitute the principal parts and portions of my airplane wing and wing spar.

The spar web member 1 is a plate member which gradually tapers from the inner end of the wing to the tip. Secured to the web member at its upper edge and extending past the upper edge slightly are angle members 2 and 3 on opposite sides of said upper edge, the width of the members of said angle members gradually decreasing outwardly toward the tip as shown best in Figs. 2 to 5 of the drawings. Secured to the lower edge in a similar manner are the angle members 6 and 7 which are similarly tapered and extend the full length of the member 1. Secured in said angle members 2 and 3 are other similar angle members nested therein designated 4 and 5 and extending nearly one-half the length of the web member 1 shown best in Fig. 2 of the drawings. Also nested in the angle members 6 and 7 at the lower side are other angle members 8 and 9 and secured to the web member 1. These angle members extend only a short distance from the inner end of the web 1 as shown best in Fig. 2 of the drawings. Thus it will be noted that the spar is made up of the tapering web member and a plurality of tapering angle members secured at the upper and lower edges, some of said angle members extending only part of the way toward the tip of the wing, thus providing a cantilever type of wing spar providing strength where required and providing the main support longitudinally of the wing. This spar formed of the web and angle members is supported on the fuselage by means of spar supports 10 and 11 which are also rigidly secured in nesting form in the outer angle members 4 and 5 and 8 and 9. And all of these angle members and supports are spaced at the ends to form the connection with the fuselage as shown best in Figs. 1 and 2 of the drawings, the holes 10a forming the connecting portion.

It will be noted that the members 10 and 11 only extend a short distance from the inner end of the spar as shown best in Fig. 2 of the drawings. Secured to the front side of the spar and extending forwardly to the leading edge are rib members 12 in spaced relation to each other. Each rib member is secured by rivets to the web member 1 and the angle members at the upper edges by means of a web portion 12a which extend outwardly on one side of the rib member 12 over the complete margin of said rib member 12. This rib member is also provided with a plurality of openings 12b and 12c around which a small ledge is formed for strengthening and reenforcing around the openings which are made for lightening said rib members. Secured to the front or leading edge of the rib member 12 is a tube 14 which forms the leading edge of the wing, and the front portion of the rib 12 is formed so as to fit substantially half way around the back portion of said tube 14 and is riveted thereto. Mounted on the side where the ledge 12a occurs is a connection member 15 which is also provided with a ledge portion which nests into the front edge of the rib member 12 and on the opposite side is another connection plate 16 which forms a reenforcement for the front edge of the rib member 12 and its connection with the tube 14 and all are riveted together as shown best in Figs. 6 and 8 of the drawings.

Secured on the outer side of the ledge 12a along the upper and lower edges of the rib 12 and over the front and side of the tube 14 is the wing covering 17, which is preferably a metallic covering, and this covering extends over the outer side of angle members secured to the web 1 and forming the spar so that the spar, rib, and tube and connections 15 and 16 are all rigidly united to form a rigid supporting construction for the leading edge of the wing.

Secured to the back or trailing edge side of the spar web 1 is the rib member 13 which is secured to the back side in the same manner as the rib 12 is secured to the front side, being provided with an extended ledge portion 13a for receiving the rivets. This rib member 13 extends backwardly some distance at its upper and lower side and secured thereto are angle members 18 and 19 which form a plane for the trailing edge of the wing which is built up in conventional manner as shown best in Fig. 7 of the drawings, the connection of the member 13 being shown best in Figs. 6 and 8 of the drawings.

The wing may be provided with a tip T in any conventional manner and also provided with ailerons A in any conventional manner as shown in Fig. 1 of the drawings.

It will be here noted that the leading edge, tube and rib connections or reenforcing plates 15 and 16 may be omitted if desired and particularly may be omitted on all except the first spar next to the fuselage for each wing.

Though I have shown and described a particular construction, combination, and arrangement of parts and portions, I do not wish to be limited to this particular construction, combination and arrangement, but desire to include in the scope of my invention the construction, combination, and arrangement substantially as set forth in the appended claims.

Having thus described my invention, what I claim as new and desire to secure by Letters Patent is:

1. In an airplane wing and wing spar, the combination of a wing spar formed I-shaped in cross section, a plurality of rib members secured to the front or leading edge side thereof formed in airfoil shape provided with a riveting ledge around its margin, a tubular member set partially into said rib members and by distortion of said rib members at the leading edge of the wing.

2. In an airplane wing and wing spar, the combination of a wing spar formed I-shaped in cross section, a plurality of rib members secured to the front or leading edge side thereof formed in airfoil shape provided with a riveting ledge around its margin, a tubular member set partially into said rib members by distortion of said rib members at the leading edge of the wing, and reenforcing members at the front side of said rib on opposite sides thereof secured to said plate and to said tube.

3. In an airplane wing and wing spar, the combination of a wing spar formed I-shaped in cross section, a plurality of rib members secured to the front or leading edge side thereof formed in airfoil shape provided with a riveting ledge around its margin, a tubular member set partially into said rib members by distortion of said rib members at the leading edge of the wing, reenforcing members at the front side of said rib on opposite sides thereof secured to said plate and to said tube, a metallic covering secured rigidly to said tubular member and to the margins of said rib and to the upper and lower sides of said wing spar, and a rib member secured to the back or trailing edge side of said wing spar and a trailing edge wing frame rigidly secured thereto.

4. In an airplane wing and wing spar, the combination of a wing spar including an I-beam tapering from its inner end to its tip, a rib member secured thereto at the front side thereof provided with a ledge turned at one side thereof around the whole margin made to form the leading edge of the airfoil, and a tubular reenforcing member secured to said rib at the extreme leading edge thereof by distortion of said rib member.

5. In an airplane wing and wing spar, the combination of a wing spar including an I-beam tapering from its iner end to its tip, a rib member secured thereto at the front side thereof provided with a ledge turned at one side thereof around the whole margin made to form the leading edge of the airfoil, a tubular reenforcing member secured to said rib at the extreme leading edge thereof by distortion of said rib member, and a covering secured over said rib and to the ledge of said rib and over said tubular member and secured to the upper and lower sides of said spar.

6. In an airplane wing and wing spar, the combination of a wing spar formed I-shaped in cross section, a plurality of rib members secured to the front or leading edge side thereof formed in airfoil shape provided with a riveting ledge around its margin, a tubular member set partially into said rib members by distortion of said rib members at the leading edge of the wing, reenforcing members at the front side of said rib on opposite sides thereof secured to said tube, and a metallic covering secured rigidly to said tubular member and to the margins of said rib and to the upper and lower sides of said wing spar.

7. In an airplane wing and wing spar, the combination of a wing spar formed I-shaped in cross section, a plurality of rib members secured to the front or leading edge side thereof formed in airfoil shape provided with a riveting ledge around its margin, a tubular member set partially into said rib members by distortion of said rib members at the leading edge of the wing, reenforcing members at the front side of said rib on opposite sides thereof secured to said tube, a metallic covering secured rigidly to said tubular member and to the margins of said rib and to the upper and lower sides of said wing spar, and a rib member secured to the back or trailing edge side of said wing spar and a trailing edge wing frame rigidly secured thereto.

MILLARD C. BOYD.